United States Patent
Wang et al.

(10) Patent No.: US 11,692,871 B2
(45) Date of Patent: *Jul. 4, 2023

(54) SYSTEM AND METHOD FOR DISPOSABLE IMAGING SYSTEM

(71) Applicant: General Electric Company, Schenectady, NY (US)

(72) Inventors: Guanghua Wang, Clifton Park, NY (US); Naveenan Thiagarajan, Latham, NY (US); Todd Garrett Wetzel, Niskayuna, NY (US); Jason Edward Dees, Ballston Lake, NY (US); Bernard Patrick Bewlay, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/530,838

(22) Filed: Nov. 19, 2021

(65) Prior Publication Data

US 2022/0074790 A1     Mar. 10, 2022

Related U.S. Application Data

(63) Continuation of application No. 15/401,927, filed on Jan. 9, 2017, now Pat. No. 11,193,820.

(51) Int. Cl.
*G01J 1/00*     (2006.01)
*G01J 1/02*     (2006.01)
(Continued)

(52) U.S. Cl.
CPC .............. *G01J 1/0252* (2013.01); *F02C 7/12* (2013.01); *G01J 5/0088* (2013.01); *G01J 5/042* (2013.01);
(Continued)

(58) Field of Classification Search
CPC ....... G01N 25/72; G01N 21/08; G01M 11/08; G01M 15/14; F02C 9/00; F02C 7/00
See application file for complete search history.

(56) References Cited

U.S. PATENT DOCUMENTS

| | | | |
|---|---|---|---|
| 6,153,889 | A | 11/2000 | Jones |
| 6,367,969 | B1 | 4/2002 | Ringermacher et al. |

(Continued)

FOREIGN PATENT DOCUMENTS

| | | |
|---|---|---|
| CN | 201903400 U | 7/2011 |
| CN | 102782258 B | 1/2015 |

OTHER PUBLICATIONS

Zombo et al., "Advanced nde systems for flexible operation and maintenance of gas turbine components", Siemens Power Generation, Inc., Nov. 28-30, 2006.

(Continued)

*Primary Examiner* — Frank F Huang
(74) *Attorney, Agent, or Firm* — Fitch, Even, Tabin & Flannery LLP

(57) ABSTRACT

An imaging device includes a plurality of electronic components, a phase change material, and a heat transfer structure. The plurality of electronic components is configured to collect data and have a predetermined temperature parameter. The plurality of electronic components is disposed within the phase change material. The phase change material has a first material phase and a second material phase. The phase change material has a first material phase and a second material phase. The phase change material is configured to absorb heat through changing from the first material phase to the second material phase. The heat transfer structure is disposed within the phase change material. The heat transfer structure is configured to conduct heat within the phase change material. The phase change material and the heat transfer structure are further configured to regulate a tem- (Continued)

perature of the electronic components below the predetermined temperature parameter.

20 Claims, 7 Drawing Sheets

(51) Int. Cl.
F02C 7/12 (2006.01)
G01J 5/04 (2006.01)
G01J 5/061 (2022.01)
G01J 5/00 (2022.01)
G05B 13/00 (2006.01)

(52) U.S. Cl.
CPC .............. *G01J 5/046* (2013.01); *G01J 5/049* (2013.01); *G01J 5/061* (2013.01); *G05B 13/00* (2013.01); *F05D 2260/207* (2013.01); *F05D 2270/112* (2013.01); *F05D 2270/804* (2013.01); *G01J 2005/0077* (2013.01)

(56) References Cited

U.S. PATENT DOCUMENTS

| | | | |
|---|---|---|---|
| 6,414,458 | B1 | 7/2002 | Hatley et al. |
| 6,517,236 | B2 | 2/2003 | Sun et al. |
| 6,570,175 | B2 | 5/2003 | Bales et al. |
| 6,701,714 | B2* | 3/2004 | Burd ................ F23R 3/60 60/766 |
| 6,796,709 | B2 | 9/2004 | Choi |
| 7,388,204 | B2 | 6/2008 | Key et al. |
| 7,422,365 | B2* | 9/2008 | Chamberlain ......... G01N 25/72 374/2 |
| 7,432,505 | B2 | 10/2008 | Brummel |
| 7,619,728 | B2 | 11/2009 | Ogburn et al. |
| 8,184,151 | B2 | 5/2012 | Zombo et al. |
| 8,431,917 | B2 | 4/2013 | Wang |
| 8,749,629 | B2 | 6/2014 | Baleine et al. |
| 8,961,007 | B2 | 2/2015 | Subramanian et al. |
| 9,058,520 | B2 | 6/2015 | Xie et al. |
| 9,255,526 | B2* | 2/2016 | Hatcher, Jr. ............... F02C 9/00 |
| 9,310,312 | B2 | 4/2016 | Jahnke et al. |
| 9,335,215 | B2 | 5/2016 | Wang |
| 9,335,216 | B2 | 5/2016 | Wang |
| 9,476,798 | B2 | 10/2016 | Pandey et al. |
| 10,830,132 | B2 | 11/2020 | Wang |
| 2003/0128736 | A1 | 7/2003 | Dalio et al. |
| 2015/0241308 | A1 | 8/2015 | Pandey et al. |
| 2016/0053219 | A1* | 2/2016 | Walker ................... C12M 41/12 435/303.1 |
| 2016/0084577 | A1* | 3/2016 | Chou ..................... B65D 81/38 29/890.035 |
| 2016/0212360 | A1 | 7/2016 | Williams et al. |

OTHER PUBLICATIONS

Shawal Jadin et al., "Gas Leakage Detection Using Thermal Imaging Technique", Computer Modelling and Simulation (UKSim), 2014 UKSim-AMSS 16th International Conference on, pp. 302-306, Mar. 26-28, 2014, Cambridge.

Douglas J et al., "An integrated approach to the application of high bandwidth optical pyrometry to turbine blade surface temperature mapping", Instrumentation in Aerospace Simulation Facilities, 1999. ICIASF 99. 18th International Congress on, p. 4/1-4/6, 1999, Toulouse.

Chiu, 2011 KTH School of Industrial Engineering and Management Division of Heat and Power Technology SE-100 44 STOCKHOLM; Heat Transfer Aspects of Using Phase Change Material in Thermal Energy Storage Applications, https://web.archive.org/web/20160117013650/http://www.diva-portal.org/smash/get/diva2:419998/fulltex.

* cited by examiner

SYSTEM AND METHOD FOR DISPOSABLE IMAGING SYSTEM

CROSS-REFERENCE TO RELATED APPLICATION

This application claims the benefit of U.S. Non-Provisional application Ser. No. 15/401,927, filed Jan. 9, 2017, which is incorporated herein by reference in its entirety.

BACKGROUND

The field of the disclosure relates generally to turbomachinery inspection equipment and, more specifically, to systems for imaging turbomachinery.

In at least some known gas turbine engines, air is pressurized in a compressor and mixed with fuel in a combustor for generating a stream of high-temperature combustion gases. These high-temperature combustion gasses create a hostile environment within the gas turbine engine, which may cause wear and tear for components within the gas turbine engine. Typically, gas turbine engines require inspections of the components within the gas turbine engine. Inspection systems, including inspection equipment, are typically used to inspected gas turbine engines. However, the hostile environment within the gas turbine engine can damage the inspection equipment. To mitigate the impact of the hostile environment on inspection equipment, inspection systems typically include substantial support systems including, but not limited to, cooling systems, data collection systems, and wiring systems. Inspection systems with substantial support systems may require extended periods of down time for the gas turbine engine to install the inspection systems. Additionally, the inspection systems may also require substantial capital investment to acquire and install the inspections systems.

BRIEF DESCRIPTION

In one aspect, an imagine device (e.g., infrared imaging device) is provided. The infrared imaging device includes a plurality of electronic components, a phase change material, and a heat transfer structure. The plurality of electronic components is configured to collect data and have a predetermined temperature parameter. The plurality of electronic components is disposed within the phase change material. The phase change material has a first material phase and a second material phase. The phase change material has a first material phase and a second material phase. The phase change material is configured to absorb heat through changing from the first material phase to the second material phase. The heat transfer structure is disposed within the phase change material. The heat transfer structure is configured to conduct heat within the phase change material. The phase change material and the heat transfer structure are further configured to regulate a temperature of the electronic components below the predetermined temperature parameter.

In another aspect, an engine is provided. The engine includes a first casing, a second casing, and an infrared imaging device. The second casing circumscribes the first casing. The second casing defines at least one port. The first casing and the second casing defines a hot fluid path. The infrared imaging device is positioned within the at least one port and configured to collect data from the hot fluid path. The infrared imaging device includes a plurality of electronic components, a phase change material, and a heat transfer structure. The plurality of electronic components is disposed within the phase change material. The phase change material has a first material phase and a second material phase. The phase change material has a first material phase and a second material phase. The phase change material is configured to absorb heat through changing from the first material phase to the second material phase. The heat transfer structure is disposed within the phase change material. The heat transfer structure is configured to conduct heat within the phase change material. The phase change material and the heat transfer structure are further configured to regulate a temperature of the electronic components below the predetermined temperature parameter.

In still another aspect, an engine is provided. The engine includes a first casing, a second casing, and an infrared imaging device. The second casing circumscribes the first casing. The first casing and the second casing defines a hot fluid path. The hot fluid path is configured to channel a stream of hot fluid through the engine. The stream of hot fluid emits a flow of heat. The infrared imaging device is configured to flow through the engine within the stream of hot fluid and to collect data from the hot fluid path. The infrared imaging device includes a plurality of electronic components, a phase change material, and a heat transfer structure. The plurality of electronic components is disposed within the phase change material. The phase change material has a first material phase and a second material phase. The phase change material has a first material phase and a second material phase. The phase change material is configured to absorb heat through changing from the first material phase to the second material phase. The heat transfer structure is disposed within the phase change material. The heat transfer structure is configured to conduct heat within the phase change material. The phase change material and the heat transfer structure are further configured to regulate a temperature of the electronic components below the predetermined temperature parameter.

DRAWINGS

These and other features, aspects, and advantages of the present disclosure will become better understood when the following detailed description is read with reference to the accompanying drawings in which like characters represent like parts throughout the drawings, wherein.

Figure 1:
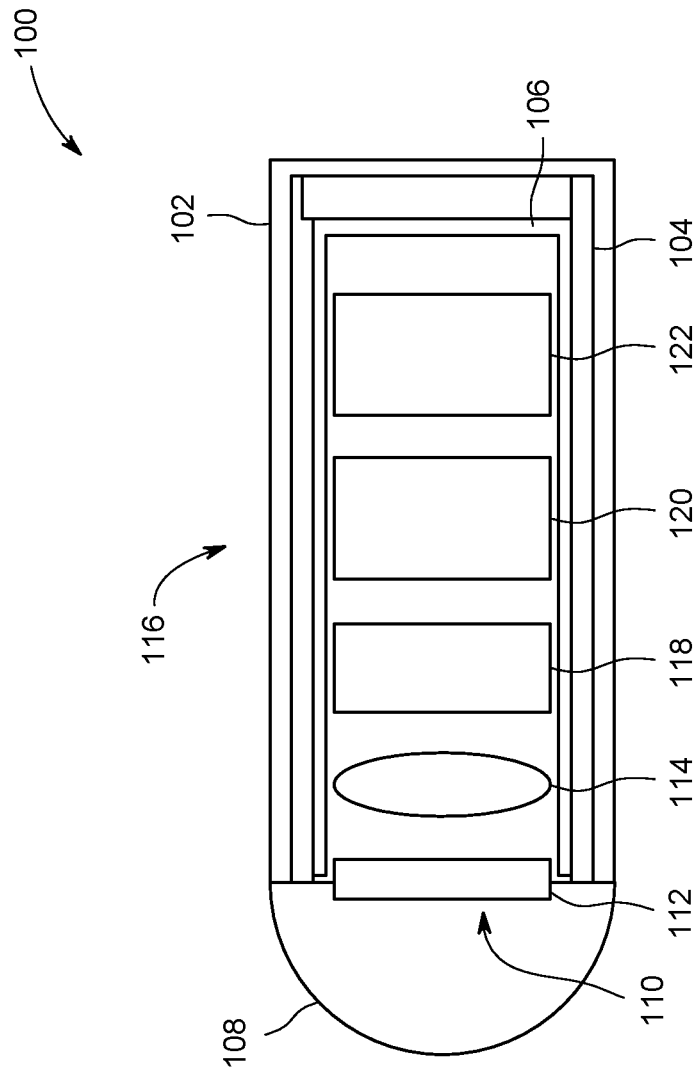
FIG. 1 is a schematic view of an exemplary imaging device.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations extending substantially parallel to a longitudinal axis of a gas turbine engine. Moreover, the terms "radial" and "radially" refer to directions and orientations extending substantially perpendicular to the longitudinal axis of the gas turbine engine. In addition, as used herein, the terms "circumferential" and "circumferentially" refer to directions and orientations extending arcuately about the longitudinal axis of the gas turbine engine.

Embodiments of the present disclosure relate to systems for imaging turbomachinery. Specifically, in the exemplary embodiment, the infrared imaging device includes electronic components encased within a phase change material (PCM) and a heat transfer structure. The electronic components record thermal images within a hostile environment with high temperatures which could damage the electronic components. The PCM and the heat transfer structure protect the electronic components by absorbing heat from the hostile environment. The heat absorbed from the hostile environment raises the temperature of the PCM until the temperature of the PCM reaches the PCM melting temperature. Once the PCM melting temperature has been reached, the temperature of the PCM remains constant until all of the PCM has melted. The PCM extends the useful life of the electronic components by maintaining the temperature of the electronic components below the safe operating temperature of the electronic components while absorbing heat from the hostile environment for a set amount of time. The heat transfer structure embedded within the PCM volume evenly distributes heat within the PCM for uniform melting and heat absorption within the PCM. The infrared imaging device of the present disclosure allows for thermal imaging of the hostile environment without extensive support systems, such as cooling systems, and without prolonged, downtime of the turbomachinery housing the hostile environment. As such, the infrared imaging device of the present disclosure provides a more cost effective method to thermally image a turbomachine.

FIG. 1 is a schematic view of an exemplary imaging device (e.g., infrared imaging device 100). Infrared imaging device 100 includes a casing 102 and an insulation material 104 positioned within casing 102. A phase change material (PCM) 106 positioned within insulation material 104. PCM 106 includes a heat transfer structure 400, 500, 600, and 700 (see FIGS. 4-7). An optical dome 108 is coupled to an open end 110 of casing 102. A filter 112 is positioned within open end 110 of casing 102 and a lens 114 is positioned behind filter 112 within PCM 106. Infrared imaging device 100 also includes a plurality of electronic components 116 positioned within PCM 106 and behind lens 114. In the exemplary embodiment, electronic components 116 include an infrared sensor 118, a battery 120, and a communication module 122.

Figure 8:
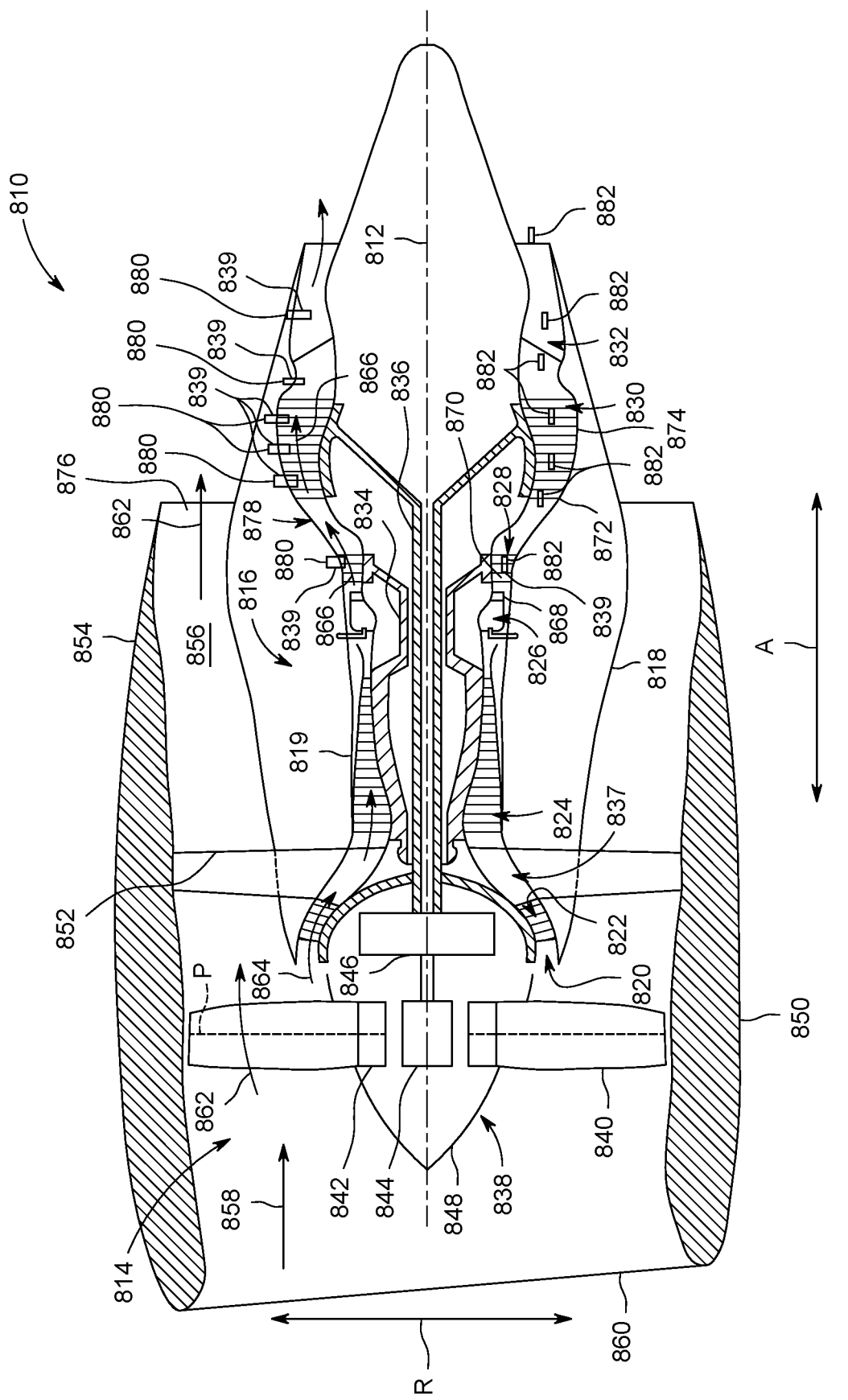
FIG. 8 is a schematic view of an exemplary rotary machine with the imaging device of FIGS. 1, 2, and 3.

During operation, infrared imaging device 100 collects data from hot gas path 878 (see FIG. 8). Specifically, infrared imaging device 100 records and transmits infrared image data from hot gas path 878 by entering hot gas path 878. Elements within hot gas path 878 emit thermal radiation. Thermal radiation enters optical dome 108 and travels through filter 112 and lens 114 to infrared sensor 118. Optical dome 108 protects filter 112 and lens 114 from hot gas path 878. Filter 112 filters or blocks visible light while allowing infrared radiation to pass through to lens 114. Lens 114 focuses infrared radiation to infrared sensor 118, which detects and converts infrared radiation into a visible image. Battery 120 provides power to infrared sensor 118 and a communication module 122. In the exemplary embodiment, communication module 122 is a wireless communication device configured to wirelessly transmit data from infrared sensor 118. Communications module 122 may be any communications device which enables infrared imaging device 100 to operate as described herein.

Figure 2:
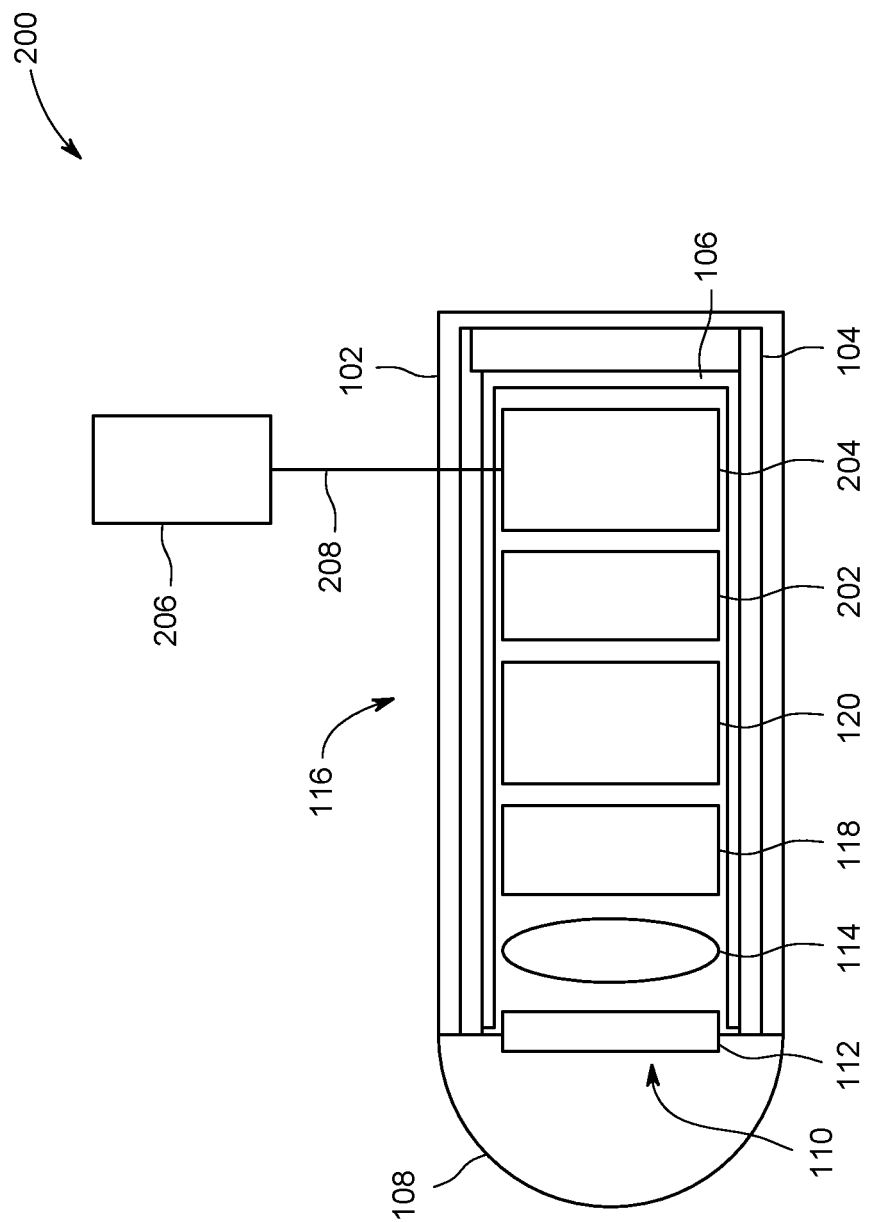
FIG. 2 is a schematic view of an alternative imaging device.

FIG. 2 is a schematic view of an exemplary infrared imaging device 200. Electronic components 116 within infrared imaging device 200 include a data storage module 202 and a communications module 204. Rather than transmitting data from infrared sensor 118 wirelessly, communications module 204 is coupled in data transfer communication with a data collection module 206 by a data transfer device 208. In the exemplary embodiment, data collection module 206 is a laptop computer. However, data collection module 206 may be any computing device which enables infrared imaging device 200 to operate as described herein. In the exemplary embodiment, data transfer device 208 is a data transfer wire. However, data transfer device 208 may be any wire which enables infrared imaging device 200 to operate as described herein.

Figure 3:
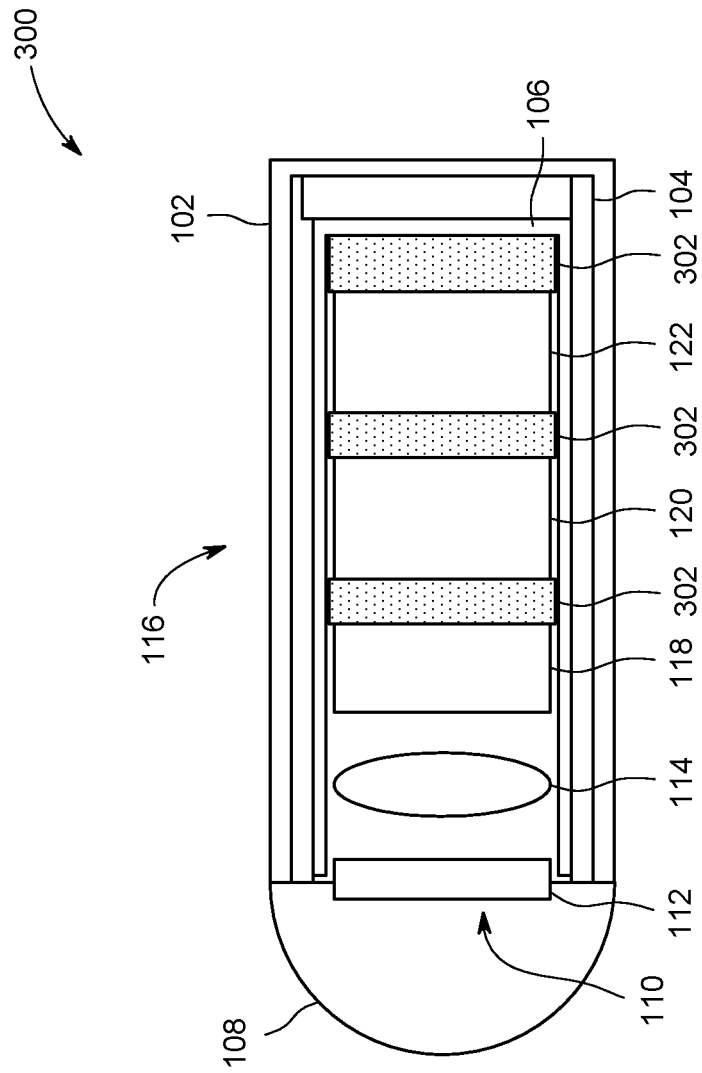
FIG. 3 is a schematic view of an alternative imaging device.

FIG. 3 is a schematic view of an exemplary infrared imaging device 300. In the exemplary embodiment, a phase change material (PCM) 302 extends between electronic components 116. Extending PCM 302 between electronic components 116 increases the amount of phase change material 106 and 302 within infrared imaging device 300 and increase the amount of heat that PCM 106 and 302 absorbs.

Electronic components 116 have a safe operating temperature. In the exemplary embodiment, the safe operating temperature of electronic components 116 includes values in a range from and including about 25° C. (77° F.) to and including about 150° C. (302° F.). In another embodiment, the safe operating temperature of electronic components 116 includes values in a range from and including about 25° C. (77° F.) to and including about 80° C. (176° F.). In yet another embodiment, the safe operating temperature of electronic components 116 is about 80° C. (176° F.). However, the safe operating temperature of electronic components 116 includes any temperature which enables infrared imaging device 100 to operate as described herein. If the temperature of electronic components 116 exceeds the safe operating temperature, electronic components 116 will fail and cease to collect data. Typically, hot gas path 878 includes temperatures which exceed the safe operating temperature of electronic components 116. As shown in FIG. 3, casing 102, insulation material 104, and PCM 106 provide thermal protection for electronic components 116 for a limited amount of time. In the exemplary embodiment, insulation material 104 includes fiberglass insulation, ceramic insulation, or microporous insulation. However, insulation material 104 may include any insulation material which enables infrared imaging device 100 to operate as described herein.

PCM 106 has a PCM melting temperature that is lower than the safe operating temperature of electronic components 116. Additionally, PCM 106 has a PCM heat of fusion which is defined as the heat absorbed per unit of mass of PCM 106, at the PCM melting temperature, which completely converts PCM 106 from a solid to a liquid. During operation, PCM 106 protects electronic components 116 by absorbing heat from hot gas path 878. The heat absorbed from hot gas path 878 raises the temperature of PCM 106 until the temperature of PCM 106 reaches the PCM melting temperature. Once the PCM melting temperature has been reached, the temperature of PCM 106 remains constant until all of PCM 106 has melted. That is, the temperature of PCM 106 remains constant until PCM 106 has absorbed an amount of heat from hot gas path 878 equal to the PCM heat of fusion multiplied by the mass of PCM 106. PCM 106 extends the useful life of electronic components 116 by maintaining the temperature of electronic components 116 below the safe operating temperature of electronic components 116 while absorbing heat from hot gas path 878 for a set amount of time 302 and 306 (see FIG. 3).

Figure 4:
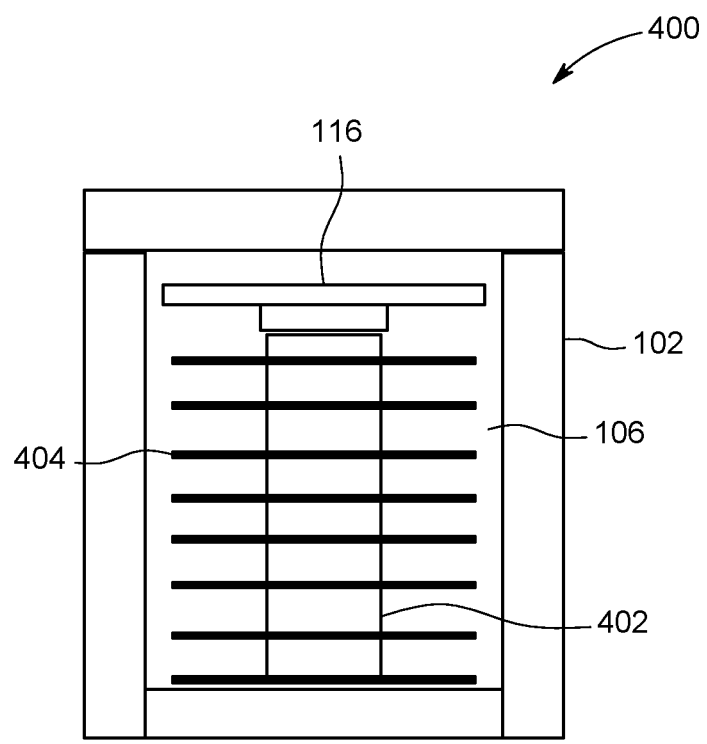
FIG. 4 is a schematic view of an exemplary heat transfer structure within the imaging device of FIGS. 1, 2, and 3.

FIG. 4 is a schematic view of an exemplary heat transfer structure 400. In the exemplary embodiment, heat transfer structure 400 includes a fin structure including a heat pipe 402 and a plurality of fins 404 extending from heat pipe 402. Heat pipe 402 and fins 404 are disposed within PCM 106. Heat pipe 402 supports fins 404 within PCM 106. In the exemplary embodiment, heat pipe 402 is coupled in heat transfer communication with case 102 and electronic components 116. Heat pipe 402 conducts heat from case 102 and electronic components 116 and directs heat to fins 404 which direct heat into PCM 106. Fins 404 evenly distribute heat within PCM 106 preventing temperature spikes within PCM 106 and electronic components 116 while PCM 106 is melting.

Figure 5:
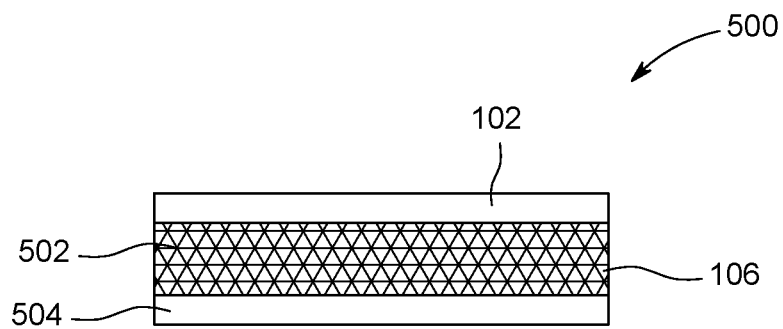
FIG. 5 is a schematic view of another exemplary heat transfer structure within the imaging device of FIGS. 1, 2, and 3.

FIG. 5 is a schematic view of an exemplary heat transfer structure 500 within case 102 and PCM 106. In the exemplary embodiment, heat transfer structure 500 includes a porous mesh 502 disposed within PCM 106. Porous mesh 502 and PCM 106 are disposed between case 102 and a PCM containment case 504. Porous mesh 502 conducts heat from case 102 and electronic components 116 and directs heat into PCM 106. Porous mesh 502 evenly distributes heat within PCM 106 preventing temperature spikes within PCM 106 and electronic components 116 while PCM 106 is melting. In the exemplary embodiment, porous mesh 502 includes a graphite mesh, a copper mesh, or an aluminum mesh. Porous mesh includes any material that enables infrared imaging device 100 to operate as described herein.

Figure 6:
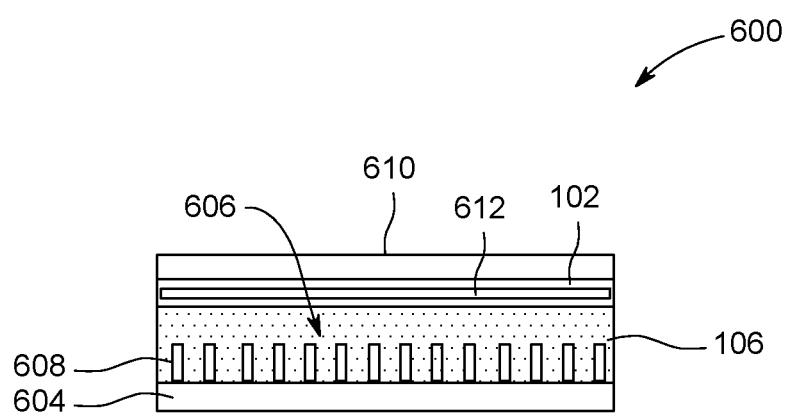
FIG. 6 is a schematic view of another exemplary heat transfer structure within the imaging device of FIGS. 1, 2, and 3.

FIG. 6 is a schematic view of an exemplary heat transfer structure 600. In the exemplary embodiment, heat transfer structure 600 includes a PCM 106. PCM 106 is disposed between case 102 and a PCM containment case 604. Heat transfer structure 600 also includes a heat transfer enhancement structure 606 extending from PCM containment case 604 and disposed within PCM 106. In the exemplary embodiment, heat transfer enhancement structure 606 includes a plurality of fins 608 extending from PCM containment case 604. Heat transfer enhancement structure 606 includes any structure that enables infrared imaging device 100 to operate as described herein. Heat transfer enhancement structure 606 conducts heat from case 102 and electronic components 116 and directs heat into PCM 106. Heat transfer enhancement structure 606 evenly distributes heat within PCM 106 preventing temperature spikes within PCM 106 and electronic components 116 while PCM 106 is melting.

In the exemplary embodiment, heat transfer structure 600 also includes an outer insulation layer 610 and an inner insulation layer 612. Outer insulation layer 610 is disposed outside of case 102 and includes, without limitation, a ceramic or fiberglass insulation layer. Inner insulation layer 612 is disposed within case 102 and includes an air chamber or a vacuum chamber. Outer insulation layer 610 and an inner insulation layer 612 absorb heat from the surrounding environment.

Figure 7:
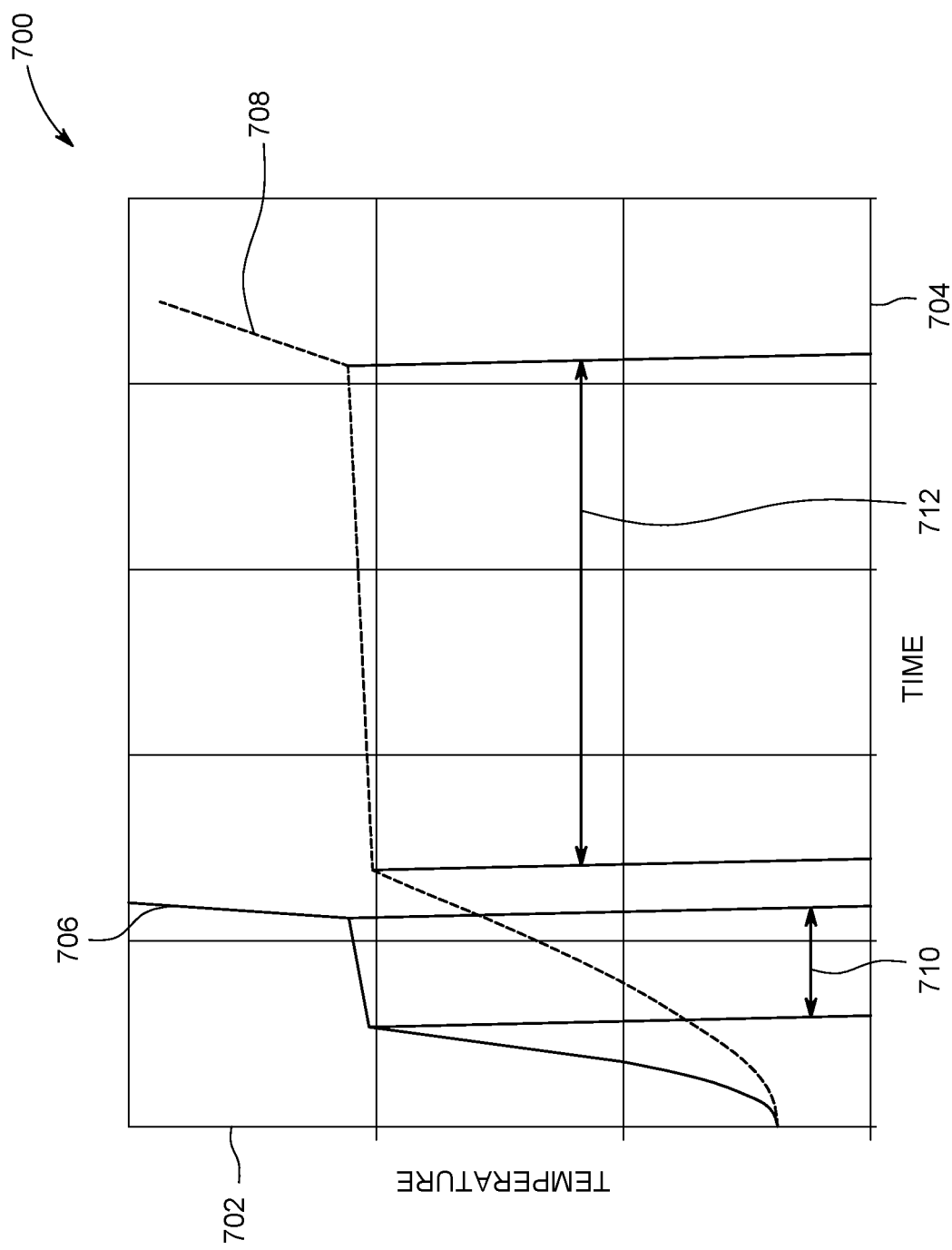
FIG. 7 is a graph of temperature measurements obtain within the imaging device of FIGS. 1, 2, and 3.

FIG. 7 is a graph 700 of temperatures within infrared imaging device 100. Graph 700 includes a unitless y-axis 702 which displays temperature and a unitless x-axis 704 which displays time. A first curve 706 depicts the temperatures of within infrared imaging device 100 when the temperature of hot gas path 878 is a first temperature. A second curve 708 depicts the temperatures of within infrared imaging device 100 when the temperature of hot gas path 878 is a second temperature. In the exemplary embodiment, the first temperature of hot gas path 878 is greater than the second temperature of hot gas path 878.

As first curve 706 shows, the temperature of infrared imaging device 100 increases when placed in hot gas path 878. Once the temperature reaches the PCM melting temperature, it remains approximately constant for a first set amount of time 710. After PCM 106 has completely melted, the temperature of infrared imaging device 100 continues to increase. Similarly, second curve 708 shows the temperature of infrared imaging device 100 increasing when placed in hot gas path 878. However, because the first temperature of hot gas path 878 is greater than the second temperature of hot gas path 878, second curve 708 increases at a slower rate than first curve 706. Once the temperature reaches PCM melting temperature, it remains approximately constant for a second set amount of time 712. After PCM 106 has completely melted, the temperature of infrared imaging device 100 continues to increase. Second set amount of time 712 is longer than first set amount of time 710 because the first temperature of hot gas path 878 is greater than the second temperature of hot gas path 878 and PCM 106 takes longer to melt. PCM 106 extends the useful life of electronic components 116 for first and second set amounts of time 710 and 712.

In the exemplary embodiment, PCM 106 includes, without limitation, an acid melt material, a salt, an organic alloy, an inorganic alloy, an eutectic alloy, or a paraffin material. Salts include sodium salts or lithium salts. However, PCM 106 may include any material which enables infrared imaging device 100 to operate as described herein. Selection of PCM 106 material depends on which electronic components 116 are within infrared imaging device 100, the length of set amounts of time 702 and 706, the safe operating temperature of electronic components 116, and the PCM melting temperature.

Infrared imaging devices 100, 200, and 300 are used to thermally image hostile environments such as hot gas paths within engines. One example of a hostile environment is the hot gas path of a gas turbine engine shown in FIG. 8. However, infrared imaging devices 100, 200, and 300 are not limited to uses within gas turbine engines. Rather infrared imaging devices 100, 200, and 300 may be used in any engine with a hot gas path or hostile environment.

FIG. 8 is a schematic cross-sectional view of a gas turbine engine 810 in accordance with an exemplary embodiment of the present disclosure. In the exemplary embodiment, gas turbine engine 810 is a high-bypass turbofan jet engine 810, referred to herein as "turbofan engine 810." Turbofan engine 810 defines an axial direction A (extending parallel to a longitudinal centerline 812 provided for reference) and a radial direction R. Turbofan engine 810 includes a fan section 814 and a core turbine engine 816 disposed downstream from fan section 814.

Exemplary core turbine engine 816 depicted generally includes a substantially tubular outer casing 818 that defines an annular inlet 820 and an inner casing 819 circumscribed by outer casing 818. Outer casing 818 encases, in serial flow relationship, a compressor section 823 including a booster or low pressure (LP) compressor 822 and a high pressure (HP) compressor 824; a combustion section 826; a turbine section including a high pressure (HP) turbine 828 and a low pressure (LP) turbine 830; and a jet exhaust nozzle section 832. A high pressure (HP) shaft or spool 834 drivingly connects HP turbine 828 to HP compressor 824. A low pressure (LP) shaft or spool 836 drivingly connects LP turbine 830 to LP compressor 822. The compressor section 823, combustion section 826, turbine section, and nozzle section 832 together define a core air flowpath 837. Inner casing 819 includes a plurality of ports 839.

In the exemplary embodiment, fan section 814 includes a variable pitch fan 838 having a plurality of fan blades 840 coupled to a disk 842 in a spaced apart manner. Fan blades 840 extend outwardly from disk 842 generally along radial direction R. Each fan blade 840 is rotatable relative to disk 842 about a pitch axis P by virtue of fan blades 840 being operatively coupled to a suitable pitch change mechanism 844 configured to collectively vary the pitch of fan blades 840 in unison. Fan blades 840, disk 842, and pitch change mechanism 844 are together rotatable about longitudinal axis 812 by LP shaft 836 across a power gear box 846. Power gear box 846 includes a plurality of gears for adjusting the rotational speed of fan 838 relative to LP shaft 836 to a more efficient rotational fan speed. In an alternative embodiment, fan blade 840 is a fixed pitch fan blade rather than a variable pitch fan blade.

Also, in the exemplary embodiment, disk 842 is covered by rotatable front hub 848 aerodynamically contoured to promote an airflow through plurality of fan blades 840. Additionally, exemplary fan section 814 includes an annular fan casing or outer nacelle 850 that circumferentially surrounds fan 838 and/or at least a portion of core turbine engine 816. Nacelle 850 is configured to be supported relative to core turbine engine 816 by a plurality of circumferentially-spaced outlet guide vanes 852. A downstream section 854 of nacelle 850 extends over an outer portion of core turbine engine 816 so as to define a bypass airflow passage 856 therebetween.

During operation of turbofan engine 810, a volume of air 858 enters turbofan engine 810 through an associated inlet 860 of nacelle 850 and/or fan section 814. As volume of air 858 passes across fan blades 840, a first portion of air 858 as indicated by arrows 862 is directed or routed into bypass airflow passage 856 and a second portion of air 858 as indicated by arrow 864 is directed or routed into core air flowpath 837, or more specifically, into LP compressor 822. The ratio between first portion of air 862 and second portion of air 864 is commonly known as a bypass ratio. The pressure of second portion of air 864 is then increased as it is routed through HP compressor 824 and into combustion section 826, where it is mixed with fuel and burned to provide combustion gases 866.

Combustion gases 866 are routed through HP turbine 828 where a portion of thermal and/or kinetic energy from combustion gases 866 is extracted via sequential stages of HP turbine stator vanes 868 that are coupled to outer casing 818 and HP turbine rotor blades 870 that are coupled to HP shaft or spool 834, thus causing HP shaft or spool 834 to rotate, thereby supporting operation of HP compressor 824. Combustion gases 866 are then routed through LP turbine 830 where a second portion of thermal and kinetic energy is extracted from combustion gases 866 via sequential stages of LP turbine stator vanes 872 that are coupled to outer casing 818 and LP turbine rotor blades 874 that are coupled to LP shaft or spool 836, thus causing LP shaft or spool 836 to rotate which causes power gear box 846 to rotate LP compressor 822 and/or rotation of fan 838.

Combustion gases 866 are subsequently routed through jet exhaust nozzle section 832 of core turbine engine 816 to provide propulsive thrust. Simultaneously, the pressure of first portion of air 862 is substantially increased as first portion of air 862 is routed through bypass airflow passage 856 before it is exhausted from a fan nozzle exhaust section 876 of turbofan engine 810, also providing propulsive thrust. HP turbine 828, LP turbine 830, and jet exhaust nozzle section 832 at least partially define a hot gas path or hostile environment 878 for routing combustion gases 866 through core turbine engine 816.

In an exemplary embodiment, a plurality of infrared imaging devices 880 positioned within ports 839 to record thermal images within hot gas path 878 during flight. PCM 106 protects electronic components 116 during a portion of the flight time. Infrared imaging devices 880 wirelessly communicate thermal images through communication module 122. In another embodiment, infrared imaging devices 880 are recovered after the flight. Communications module 204 transfers thermal images to data collection module 206 through data transfer device 208.

In another embodiment, at least one infrared imaging device 882 is positioned within hot gas path 878. FIG. 8 shows one infrared imaging device 882 as it progresses through hot gas path 878. Infrared imaging device 882 is introduced into hot gas path 878 through a port 839 and follows the flow of combustion gases 866 though hot gas path 878. Infrared imaging device 882 is expelled from gas turbine engine 810 through nozzle section 832. Infrared imaging devices 882 wirelessly communicate thermal images through communication module 122. In another embodiment, infrared imaging devices 882 are recovered after the flight. Communications module 204 transfers thermal images to data collection module 206 through data transfer device 208.

Exemplary turbofan engine 810 depicted in FIG. 8 is by way of example only, and that in other embodiments, turbofan engine 810 may have any other suitable configuration. It should also be appreciated, that in still other embodiments, aspects of the present disclosure may be incorporated into any other suitable gas turbine engine. For example, in other embodiments, aspects of the present disclosure may be incorporated into, e.g., a turboprop engine.

In the exemplary embodiments, infrared imaging devices 880 and 882 are disposable and designed to be disposed of after one use. Additionally, the capital cost of infrared imaging devices 880 and 882 is lower than traditional permanently installed monitoring systems. Finally, gas turbine engine 810 can be monitored and imaged during operation, rather than testing and monitoring gas turbine engine 810 on the ground and requiring substantial down time. Thus, infrared imaging devices 880 and 882 provide a cost effective device for thermally imaging gas turbine engine 810 during operation.

The above-described embodiments provide an efficient system for thermally imagining a turbomachine. Specifically, in the exemplary embodiment, the infrared imaging device includes a phase change material. The PCM protects the electronic components within the infrared imaging device by absorbing heat from the hostile environment. The PCM extends the useful life of the electronic components by maintaining the temperature of the electronic components below the safe operating temperature of the electronic components while absorbing heat from the hostile environment for a set amount of time. The infrared imaging device of the present disclosure allows for thermal imaging of the hostile environment without extensive support systems, such as cooling systems, and without prolonged, downtime of the turbomachinery housing the hostile environment. As such, the infrared imaging device of the present disclosure provides a more cost effective method to thermally image a turbomachine.

An exemplary technical effect of the systems and methods described herein includes at least one of: (a) taking thermal images within a hostile environment; (b) maintaining a temperature of electronic components within an infrared imaging device below a safe operating temperature for a set amount of time; (c) absorbing heat from a hostile environment with a phase change material by melting the phase change material; and (d) extending the useful life of electronic components within an infrared imaging device.

Exemplary embodiments of systems and methods for an infrared imaging device are described above in detail. The methods and systems are not limited to the specific embodiments described herein, but rather, components of systems and/or steps of the methods may be utilized independently and separately from other components and/or steps described herein. For example, the method may also be used in combination with other imaging devices, and are not limited to practice only with the infrared imaging device as described herein. Rather, the exemplary embodiment can be implemented and utilized in connection with many other imaging devices.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An imaging device comprising:
a plurality of electronic components configured to collect data, said plurality of electronic components having a predetermined temperature parameter;
a phase change material, said plurality of electronic components disposed within said phase change material, said phase change material having a first material phase and a second material phase, said phase change material configured to absorb heat through changing from the first material phase to the second material phase; and
a heat transfer structure disposed within said phase change material, said heat transfer structure configured to conduct heat within said phase change material, wherein said phase change material and said heat transfer structure are further configured to regulate a temperature of said electronic components below the predetermined temperature parameter.

2. The imaging device in accordance with claim 1, further comprising an insulation material, said plurality of electronic components disposed within said insulation material.

3. The imaging device in accordance with claim 2, further comprising a casing, said plurality of electronic components disposed within said casing.

4. The imaging device in accordance with claim 3, further comprising an optical dome coupled to said casing.

5. The imaging device in accordance with claim 1, wherein said heat transfer structure comprises a heat pipe and a plurality of fins coupled to said heat pipe.

6. The imaging device in accordance with claim 1, wherein said heat transfer structure comprises a porous mesh.

7. The imaging device in accordance with claim 1, wherein said phase change material comprises at least one of a paraffin, a salt, or an acid melt material.

8. An engine comprising:
a first casing;
a second casing circumscribing said first casing, said second casing defining at least one port, said first casing and said second casing defining a hot fluid path; and
an imaging device positioned within said at least one port, said imaging device configured to collect data from said hot fluid path, said imaging device comprising:
a plurality of electronic components configured to collect data from said hot fluid path, said plurality of electronic components having a predetermined temperature parameter; and
a phase change material, said plurality of electronic components disposed within said phase change material, said phase change material having a first material phase and a second material phase, said phase change material configured to absorb heat through changing from the first material phase to the second material phase; and
a heat transfer structure disposed within said phase change material, said heat transfer structure configured to conduct heat within said phase change material, wherein said phase change material and said heat transfer structure are further configured to regulate a temperature of said electronic components below the predetermined temperature parameter.

9. The engine in accordance with claim 8, further comprising an insulation material, said plurality of electronic components disposed within said insulation material.

10. The engine in accordance with claim 9, further comprising a casing, said plurality of electronic components disposed within said casing.

11. The engine in accordance with claim 10, further comprising an optical dome coupled to said casing.

12. The engine in accordance with claim 8, wherein said electronic components comprise a communications module configured to transmit data collected by said imaging device.

13. The engine in accordance with claim 12, wherein said communications module configured to wirelessly transmit data collected by said imaging device.

14. The engine in accordance with claim 8, wherein said phase change material comprises at least one of an acid melt material, a salt, an organic alloy, an inorganic alloy, an eutectic alloy, or a paraffin material.

15. An engine comprising:
   a first casing;
   a second casing circumscribing said first casing, said first casing and said second casing defining a hot fluid path, said hot fluid path configured to channel a stream of hot fluid through said engine, said stream of hot fluid emitting a flow of heat; and
   an imaging device configured to flow through said engine within said stream of hot fluid, said imaging device further configured to collect data from said hot fluid path, said imaging device comprising:
   a plurality of electronic components configured to collect data from said hot fluid path, said plurality of electronic components having a predetermined temperature parameter; and
   a phase change material, said plurality of electronic components disposed within said phase change material, said phase change material having a first material phase and a second material phase, said phase change material configured to absorb heat through changing from the first material phase to the second material phase; and
   a heat transfer structure disposed within said phase change material, said heat transfer structure configured to conduct heat within said phase change material, wherein said phase change material and said heat transfer structure are further configured to regulate a temperature of said electronic components below the predetermined temperature parameter.

16. The engine in accordance with claim 15, wherein said phase change material comprises at least one of a paraffin, a salt, or an acid melt material.

17. The engine in accordance with claim 15, further comprising an insulation material, said plurality of electronic components disposed within said insulation material.

18. The engine in accordance with claim 17, further comprising a casing, said plurality of electronic components disposed within said casing.

19. The engine in accordance with claim 18, wherein said electronic components comprise a communications module configured to transmit data collected by said imaging device.

20. The engine in accordance with claim 19, wherein said communications module configured to wirelessly transmit data collected by said imaging device.

* * * * *